United States Patent

Hanisko

[11] Patent Number: 5,698,770
[45] Date of Patent: Dec. 16, 1997

[54] METHOD AND APPARATUS FOR TRIMMING GAIN OF AN ACCELEROMETER

[75] Inventor: John Cyril P. Hanisko, Southfield, Mich.

[73] Assignee: TRW Inc., Lyndhurst, Ohio

[21] Appl. No.: 659,352

[22] Filed: Jun. 6, 1996

[51] Int. Cl.⁶ ................................................ G01B 7/16
[52] U.S. Cl. ................................................ 73/1 D; 73/765
[58] Field of Search .................... 73/1 D, 498, 514.01, 73/765

[56] References Cited

U.S. PATENT DOCUMENTS

| | | |
|---|---|---|
| 3,847,017 | 11/1974 | Watts . |
| 3,909,601 | 9/1975 | Yamawaki et al. . |
| 4,085,363 | 4/1978 | Gravina et al. . |
| 4,197,478 | 4/1980 | Silvus, Jr. . |
| 4,671,113 | 6/1987 | Carome . |
| 5,060,504 | 10/1991 | White et al. . |
| 5,095,750 | 3/1992 | Suzuki et al. . |
| 5,103,667 | 4/1992 | Allen et al. . |
| 5,261,694 | 11/1993 | White et al. . |
| 5,295,387 | 3/1994 | Buie et al. . |

Primary Examiner—Robert Raevis
Attorney, Agent, or Firm—Tarolli, Sundheim, Covell, Tummino & Szabo

[57] ABSTRACT

An apparatus for trimming gain of an accelerometer to a desired gain value $G_r$. The apparatus includes an accelerometer for providing an electric signal indicative of experienced acceleration with an intrinsic gain $G_s$. An amplifier amplifies the accelerometer signal with an amplification value responsive to the accelerometer's intrinsic gain $G_s$ so as to have the desired gain value $G_r$.

8 Claims, 2 Drawing Sheets

METHOD AND APPARATUS FOR TRIMMING GAIN OF AN ACCELEROMETER

BACKGROUND OF THE INVENTION

1. Technical Field

The present invention is directed to an accelerometer that provides a signal indicative of sensed acceleration, and specifically to adjusting the gain of such an accelerometer.

2. Description of the Prior Art

An electrical accelerometer is used for sensing acceleration and provides an electrical signal indicative of that acceleration. Each accelerometer has an associated gain. The gain is the value of the electric signal for an applied acceleration divided by that applied acceleration. An accelerometer's gain is typically expressed in millivolts per g (g is the acceleration due to gravity, 32 ft./sec.$^2$). Finite manufacturing tolerances manifest themselves as gain variations among accelerometers. This is true even for the same type or model of accelerometer assembled by the same manufacturer. Moreover, temperature changes can also cause the gain of an accelerometer to shift as the temperature varies. Such gain variations necessitate the calibration of a particular accelerometer for use in a particular system.

Prior art references disclose systems to compensate for such gain variations by calibrating the accelerometer. For example, U.S. Pat. No. 5,060,504 to White et al. discloses a self-calibrating accelerometer that includes a sensing mass supported relative to a frame by a plurality of beams having a plurality of resistors integral therewith. The beam resistances vary as the sensing mass is displaced in response to an acceleration. The sensing mass displacement produces a corresponding change in the output of a Wheatstone bridge incorporating the beam resistors. To calibrate the accelerometer, the sensing mass is electrostatically deflected, thereby subjecting the mass to the equivalent of a known acceleration. One leg of the Wheatstone bridge has a variable resistor in series with the beam resistor thereof. The resistance value of the variable resistor is controlled by a microprocessor to calibrate the bridge output and compensate for temperature effects and manufacturing tolerances.

U.S. Pat. No. 5,103,667 to Allen et al. similarly discloses a self-testing and self-calibrating accelerometer. The accelerometer includes a housing, a diaphragm for detecting movement in response to an applied force, and a mass on the diaphragm. A capacitive plate is attached to the housing and disposed such that an electric potential difference between the plate and the mass causes movement of the mass. A piezoresistive element attached to the housing and the diaphragm senses movement of the mass. The capability to electrostatically deflect the mass and thereby simulate a known acceleration, in combination with the piezoresistive sensing of that deflection, allows testing and calibration of the accelerometer at any stage of its manufacture.

SUMMARY OF THE INVENTION

A method and apparatus are provided to control the gain of an accelerometer module. An accelerometer having an intrinsic gain has its output signal amplified by an amount responsive to the intrinsic gain value so as to provide resultant acceleration signal with a desire gain value.

In accordance with the embodiment of the present invention, an apparatus for trimming gain of an accelerometer to a desired gain value $G_t$ includes an accelerometer for providing an electric signal indicative of experienced acceleration. The accelerometer has an intrinsic gain $G_r$. The apparatus further includes means for amplifying the accelerometer signal with an amplification responsive to the accelerometer intrinsic gain $G_r$.

In accordance with another embodiment of the present invention, a method is provided for trimming the operational gain of an accelerometer comprising the steps of providing an accelerometer having an intrinsic gain $G_r$ and controlling amplification of an output of the accelerometer in response to the intrinsic gain $G_r$.

BRIEF DESCRIPTION OF THE DRAWINGS

Other features and advantages of the present invention will become apparent to those skilled in the art to which the present invention relates from a reading of the following detailed description with reference to the accompanying drawings, in which.

DESCRIPTION OF PREFERRED EMBODIMENTS

Figure 1:
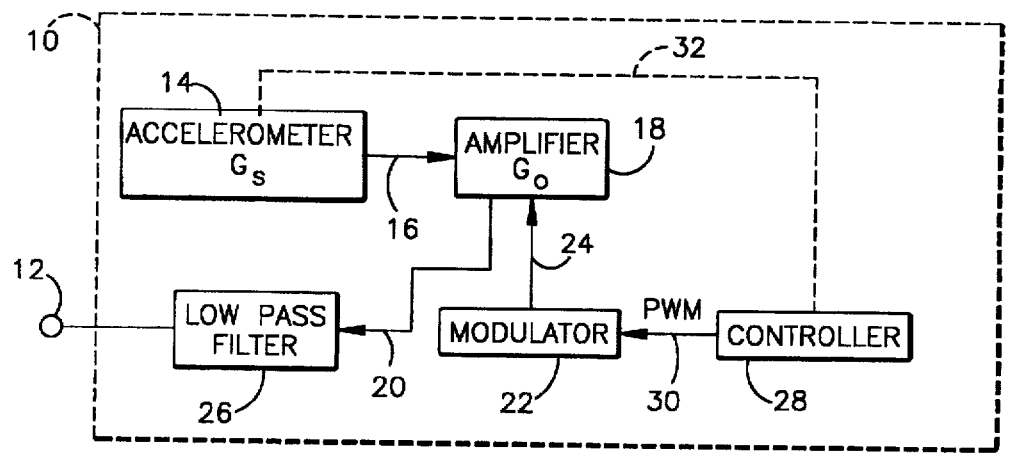
FIG. 1 is a block diagram showing accelerometer gain control in accordance with one embodiment of the present invention.

FIG. 1 is a block diagram of a module assembly 10 made in accordance with one embodiment of the present invention. When the module assembly 10 is subjected to an acceleration, it outputs a gain adjusted acceleration signal 12 indicative of the sensed acceleration. The overall or operational gain $G_t$ of the module assembly 10 is defined as the ratio of the value of the acceleration signal 12 divided by the value of the acceleration causing that signal. The operational gain $G_t$ is expressed in terms of millivolts per g, where g is the well known value of acceleration due to gravity. For a particular module assembly 10, the operational gain $G_t$ is preselected to be a desired value. The operational gain is adjusted during assembly of each module so as to establish the preselected desired value $G_t$. In this way, each module will have the same operational gain.

The module assembly 10 includes an accelerometer 14. The accelerometer 14 senses acceleration and provides an electric signal 16 indicative thereof. The accelerometer 14 itself has an intrinsic gain $G_r$, which is determined empirically. Methods for determining the intrinsic gain $G_r$, such as shakers or electrostatic deflection of a mass, are known in the art. Finite manufacturing tolerances cause the intrinsic gain $G_r$ to vary among accelerometer units. As a result, the module assembly 10 must process the value of the acceleration signal 16 from its associated accelerometer 14 to establish the operational gain of the module at the preselected desired value $G_t$.

The acceleration signal 16 is connected to an amplifier 18. The amplifier 18 amplifies the acceleration signal 16 by a maximum gain value $G_o$ and outputs an amplified acceleration signal 20. In the embodiment shown in FIG. 1, the maximum gain value $G_o$ of the amplifier 18 is assumed to be constant for each module assembly 10.

The gain of the amplifier 18 is controlled by a gain control modulator 22. The gain control modulator 22 adjusts the gain of the amplifier 18 through a connection 24. The output 20 of amplifier 18 is connected to a low pass filter 26, which filters the amplified signal. The output from the low pass filter 26 is the gain adjusted acceleration signal 12.

A controller 28 provides a pulse-width-modulated ("PWM") signal 30 to the gain control modulator 22. The controller 28 is preferably a microcomputer. The duty cycle of the PWM signal 30 controls the value of the gain of the amplifier 18 so as to be at the preselected desired value $G_t$. The controller 28 determines the needed duty cycle of the PWM signal 30 using the known intrinsic gain $G_s$ of the accelerometer 14, the known maximum gain value $G_o$ of the amplifier 18, and the desired operational gain value $G_t$, and the known functional relationship f between $G_t$, $G_s$, $G_o$, and duty cycle. The duty cycle, designated $\tau/T$, of the PWM signal 30 is determined using the formula:

$$\tau/T = f(G_t, G_s, G_o)$$

where $\tau$ is the pulse duration during a period T.

To determine the needed duty cycle of the PWM signal 30, the controller 28 must be provided with the values for the gains $G_t$, $G_o$, and $G_s$ and with the functional relationship f. The operational gain $G_t$ is preselected for a particular type of module assembly 10 depending on the module's application, and is the same for each module of that type. The gain values $G_t$ and $G_o$ for the particular module and the functional relationship f are stored in an internal memory of the controller 28 of the module assembly 10. Means for storing parameter values as well as functional relationships, e.g., equations, in the memory of a microcomputer are known in the art.

In determining the needed duty cycle of the PWM signal 30, the controller 28 also needs to "know" the intrinsic gain $G_s$ of the accelerometer 14. The intrinsic gain $G_s$ is not the same for all accelerometers 14 and, therefore, each controller 28 must be given the value of $G_s$ for its associated accelerometer. In FIG. 1, the line 32 represents a means to provide the controller 28 with the intrinsic gain value $G_s$ for its accelerometer 14. The intrinsic gain value of the accelerometer 14 is measured through standard known processes, and the measured value is communicated to the controller 28. One skilled in the art will appreciate that any of a plurality of means may be used to load the intrinsic gain value of the accelerometer 14 into the controller 28. For example, the intrinsic gain value $G_s$ may be predetermined by the accelerometer manufacturer and encoded using a bar code designation attached to the accelerometer case. A scanner would then be used to scan the bar code during manufacturing of the module assembly 10. The intrinsic gain value scanned would be inputted to the controller 28 via a standard serial communications link. Alternatively, the accelerometer 14 may have an associated memory which stores a predetermined value of $G_s$. The controller 28 would then interrogate the accelerometer 14 over a communications line 32 and, in that way, read the value of $G_s$. The value of $G_s$ based on the manufacture's data may also be manually programmed into controller 28 through a data link such as a keyboard.

The operational gain $G_t$ of a particular module assembly 10 is established either prior to, or during, production assembly of that module. An accelerometer 14, having a known intrinsic gain $G_s$, is operatively connected to a particular module assembly 10. The intrinsic gain $G_s$ of that accelerometer is read by or input into the controller 28. The controller 28 then calculates the duty cycle $\tau/T$ for that module such that the module operational gain is equal to the desired value $G_t$. In this way, the operational gain $G_t$ of a group of module assemblies is the same, independent of the different intrinsic gain values $G_s$ between the different accelerometers 14 associated with the module assemblies. By establishing a constant operational gain value $G_t$ for the group of module assemblies 10, the gain adjusted acceleration signal 12 output from each module assembly will be the same for the same value of sensed acceleration.

The present invention is particularly useful in an actuatable restraint system for a vehicle. Each module assembly for a particular type of vehicle will output the same electrical signal value for the same sensed acceleration value because the operational gain value $G_t$ for each module will be the same. This arrangement permits consistent crash discrimination due to the consistent crash acceleration to the acceleration signal value.

Figure 2:
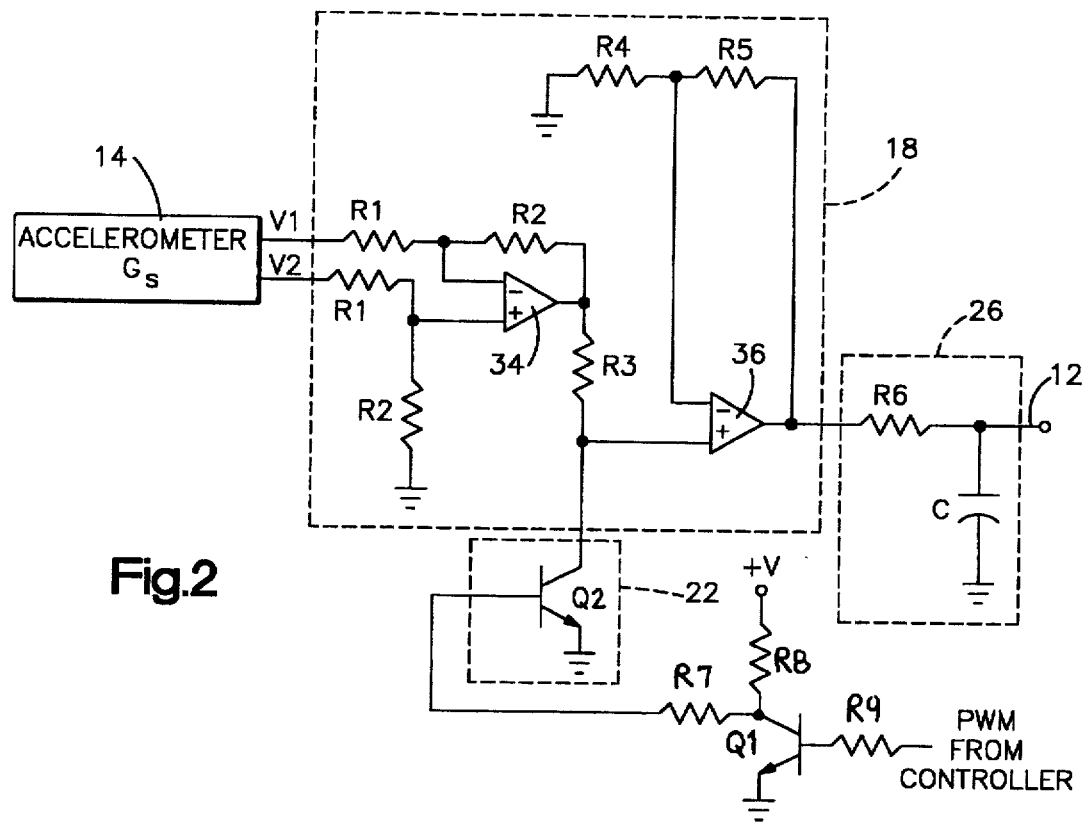
FIG. 2 is schematic of a specific implementation of the accelerometer gain control circuit in accordance with the present invention.

FIG. 2 is a schematic of a specific implementation of the accelerometer gain control circuit in accordance with the present invention. The accelerometer 14 has two output terminals, designated V1 and V2. The value of the acceleration experienced by the accelerometer 14 is indicated by the differential voltage output on terminals V1 and V2. In particular:

$$V1 - V2 = a \cdot G_s$$

where a is the acceleration and $G_s$ is the accelerometer intrinsic gain value.

The V1 terminal of accelerometer 14 is connected to the inverting input of an amplifier 34 through a resistor having a resistance value R1. The output of the amplifier 34 is connected to its inverting input through a resistor having a resistance value R2. The V2 terminal of accelerometer 14 is connected to the non-inverting input of an amplifier 34 through a resistor having a resistance value R1. The non-inverting input of amplifier 34 is connected to electrical ground through a resistor having a resistance value R2.

The output of amplifier 34 is connected to the non-inverting input of an amplifier 36 through a resistor having a resistance value R3. The output of the amplifier 36 is connected to its inverting input through a resistor having a resistance value R5. The inverting input of amplifier 36 is connected to electrical ground through a resistor having a resistance value R4. The output of amplifier 36 is also connected to an RC low pass filter 26 having a resistor of resistance value R6 and a capacitor having capacitor value C. The RC junction is the output 12. The other terminal of the capacitor is connected to electrical ground.

The modulator 22 is implemented using a transistor Q2 having its collector connected to the non-inverting input of amplifier 36, its emitter connected to electrical ground, and its base connected, through resistor R7, to the collector of transistor Q1, which has its base connected, through R9, to the PWM output of controller 28. Rather than transistors, those skilled in the art will appreciate that FETs or other solid state switching devices can be used.

Amplifier 34 is connected so as to form a differential amplifier with a gain of:

$$G_{34} = \frac{R2}{R1}$$

The average voltage present at the non-inverting input of the amplifier 36 is:

$$(V_2 - V_1) \cdot \left(\frac{R2}{R1}\right) \cdot \frac{\tau}{T}$$

The resultant DC voltage across the filter capacitor of the RC low pass filter 26 (i.e., the voltage at terminal 12) is:

$$V_{12} = (V_2 - V_1) \cdot \left(\frac{R2}{R1}\right) \cdot \left(\frac{R4+R5}{R4}\right) \cdot \frac{\tau}{T}$$

where $$V_{12} = a \cdot G_t$$

and $$(V_2 - V_1) = a \cdot G_s$$

$$G_o = \left(\frac{R2}{R1}\right) \cdot \left(\frac{R4+R5}{R4}\right)$$

The functional relationship f may be expressed as:

$$f = \frac{G_t \cdot R1 \cdot R4}{G_s \cdot R2 \cdot (R4+R5)}$$

From the above:

$$G_t = G_s \cdot \frac{R2}{R1} \cdot \frac{R4+R5}{R4} \cdot \frac{\tau}{T}$$

and $$G_t = G_s \cdot G_o \cdot \frac{\tau}{T}$$

Therefore, $$\frac{\tau}{T} = \frac{G_t}{G_s \cdot G_o}$$

The frequency of the PWM signal is selected so as to be substantially higher than the highest frequency of interest expected to be present in the acceleration signal. If the accelerometer is to be used in a vehicle actuatable restraint system, e.g., an air bag, the values of R6 and C are selected so as to pass all important frequency components needed for proper discrimination of a vehicle crash condition. U.S. Pat. No. 5,185,701 to Blackburn et al., describes a "Method For Determining Frequency Components in a Vehicle Crash" and is hereby incorporated herein by reference. Also, the values of R6 and C are selected with consideration to the need to reduce ripple components present at the output of amplifier 36 due to the PWM signal.

Figure 3:
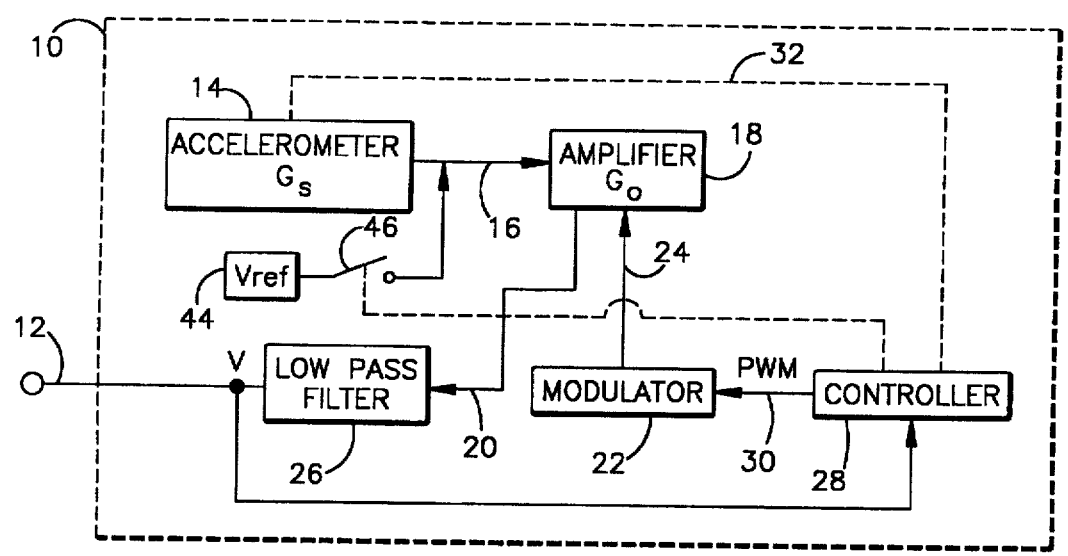
FIG. 3 is a block diagram showing a second embodiment for accelerometer gain control circuit in accordance with the present invention.

FIG. 3 is a block diagram of an alternative embodiment of the present invention. In accordance with this alternative embodiment, the gain $G_o$ of the amplifier 18 is not assumed to be the same for all module assemblies 10 during manufacture. Therefore, the controller 28 can no longer establish the duty cycle of the PWM signal 30 according to the equation $\tau/T = f(G_t, G_s, G_o)$ since $G_o$ is unknown for a particular module assembly 10. To measure the gain $G_o$ for this arrangement, a voltage reference 44 is utilized. The voltage reference 44 provides a known precision voltage.

In establishing the desired operational gain $G_t$, the controller 28 first reads the intrinsic gain $G_s$ of the accelerometer 14 using one of the means 32 previously discussed. From a given intrinsic gain $G_s$ for a particular accelerometer being used, the controller 28 determines the value of the gain adjusted acceleration signal 12, designated $V_{req}$, required to obtain the desired operational gain $G_t$. The required value $V_{req}$ is determined by the equation $V_{req} = (G_t/G_s) V_{ref}$, where $V_{ref}$ is the value of the voltage reference 44.

Once the controller 28 determines $V_{req}$, the controller closes a switch 46 and thereby connects the voltage reference 44 to the input of the amplifier 18. With the voltage reference 44 as the input to the amplifier 18, the actual value of the gain adjusted acceleration signal 12, designated $V_{act}$, is given by the equation:

$$V_{act} = V_{ref} \cdot g\left(G_o, \frac{\tau}{T}\right)$$

where g is the modulated version of $G_o$. To establish the desired operational gain $G_t$, for the module assembly 10, the actual value $V_{act}$ and the required value $V_{req}$ of the gain adjusted acceleration signal 12 must be equal (i.e., $V_{act} = V_{req}$).

Because the amplifier gain $G_o$ is unknown, the controller 28 cannot merely calculate the required duty cycle. Instead, the controller 28 must vary the duty cycle $\tau/T$ until the actual value $V_{act}$ of the gain adjusted acceleration signal 12 equals the required value $V_{req}$. To do this, the controller 28 selects an initial predetermined duty cycle $\tau/T$ using a nominal value for the amplifier gain $G_o$. The controller 28 then monitors the actual value $V_{act}$ that results from this initial duty cycle. The controller 28 varies the duty cycle $\tau/T$ until the actual value $V_{act}$ of the gain adjusted acceleration signal 12 equals the required value $V_{req}$. Once the controller 28 establishes the duty cycle $\tau/T$ such that $V_{req} = V_{act}$, the variation in gain $G_o$ of the module assembly 10 is corrected and switch 46 is then opened. The PWM cycle is thereafter further adjusted to correct any variation in the accelerometer gain $G_s$ such that $G_t = G_s$ ($V_{act}/V_{ref}$) thereby giving the desired module gain $G_t$.

While both embodiments of the present invention have been described as achieving a constant operational gain $G_t$ for a module assembly 10, such a gain need not to be constant. For example, if the temperature coefficient of the intrinsic gain $G_s$ is known and made available to the controller 28 through the means 32, the operational gain $G_t$ of a module assembly can be temperature compensated also.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for trimming gain of an accelerometer to a desired gain value $G_t$, said apparatus comprising:

an accelerometer for providing an electric signal indicative of experienced acceleration with an intrinsic gain $G_s$; and means for amplifying said accelerometer signal with an amplification responsive to the accelerometer's intrinsic gain $G_s$, including a variable amplifier wherein the amplification is controlled in response to said intrinsic gain $G_s$, said variable amplifier being controlled with a PWM signal and said PWM signal is responsive to said intrinsic gain $G_s$.

2. An apparatus for trimming the gain of an accelerometer, comprising:

an accelerometer for sensing acceleration and providing an electrical signal indicative of experienced acceleration, said accelerometer having an intrinsic gain $G_s$;

gain adjustment means connected to said electrical signal from said accelerometer for amplifying said electrical signal from said accelerometer in response to a control signal and providing a final acceleration signal; and control means for controlling said gain adjustment means in response to said intrinsic gain $G_s$ of said accelerometer so that said final acceleration signal is substantially equal to the experienced acceleration times a desired gain value $G_r$, said control means including means for providing a pulse-width-modulated signal to said gain adjustment means, said gain adjustment means being responsive to said pulse width modulated signal.

3. The apparatus of claim 2 wherein said control means includes means for controlling said gain adjustment means so that said gain value $G_r$ is a constant predetermined value.

4. The apparatus of claim 2 further including means for communicating said intrinsic gain value $G_s$ to said control means.

5. An apparatus for trimming the gain of an accelerometer, comprising:

an accelerometer for sensing acceleration and providing an acceleration signal indicative of experienced acceleration, said accelerometer having an intrinsic gain $G_s$;

amplifying means for amplifying said acceleration signal and providing a signal indicative of said experienced acceleration times a predetermined gain value $G_r$;

means for communicating said intrinsic gain value $G_s$ to a control means; and said control means controlling said amplifying means in response to said intrinsic gain $G_s$ of said accelerometer so as to achieve said predetermined gain value $G_r$.

6. An accelerometer assembly having a gain trimmable to a predetermined desired gain value $G_r$, said assembly comprising:

an accelerometer for providing an electric signal indicative of acceleration experienced by said accelerometer, said accelerometer having an intrinsic gain value $G_s$;

amplifier means for amplifying said accelerometer signal, said amplifier means having an adjustable amplification;

control means operatively coupled to said amplifier means for controlling the amplification of said accelerometer signal; and means for inputting the intrinsic gain value $G_s$ of said accelerometer to said control means, said control means controlling said amplification of said electric signal from said accelerometer in response to said intrinsic gain value $G_s$ input to said control means so that the gain of said accelerometer assembly is said predetermined desired gain value $G_r$.

7. A method for trimming the gain of an accelerometer assembly to a predetermined desired gain value $G_r$, said method comprising the steps of:

providing an accelerometer that outputs an electric signal indicative of acceleration experienced by said accelerometer, said accelerometer having an intrinsic gain value $G_s$;

amplifying said accelerometer signal with an amplifier having an adjustable amplification;

inputting the intrinsic gain value $G_s$ of said accelerometer to a controller; and controlling amplification of said amplifier in response to said intrinsic gain value $G_s$ input to said controller so that the gain of said accelerometer assembly is said predetermined desired gain value $G_r$.

8. A method for trimming the gain of a plurality of accelerometer assemblies to a predetermined desired gain value $G_r$, each accelerometer assembly having an accelerometer that outputs an electric signal indicative of acceleration experienced by said accelerometer and each accelerometer having an associated intrinsic gain value $G_s$, said method comprising the steps of:

(i) amplifying an accelerometer signal from a selected accelerometer assembly with an associated amplifier having an adjustable amplification;

(ii) inputting the intrinsic gain value $G_s$ of the selected accelerometer to an associated controller;

(iii) controlling amplification of said selected amplifier in response to its associated intrinsic gain value $G_s$ input to its associated controller so that the gain of the selected accelerometer assembly is said predetermined desired gain value $G_r$; and (iv) repeating steps (i) through (iii) for all of the plurality of accelerometer assemblies so that all of the accelerometer assemblies have the same predetermined desired gain value $G_r$.

* * * * *